United States Patent [19]

Viré

[11] Patent Number: 4,568,430
[45] Date of Patent: Feb. 4, 1986

[54] PROCESS FOR REFINING SCRAP ALUMINUM

[75] Inventor: Sylvestre Viré, Neuhausen am Rheinfall, Switzerland

[73] Assignee: Swiss Aluminium Ltd., Chippis, Switzerland

[21] Appl. No.: 697,964

[22] Filed: Feb. 4, 1985

[30] Foreign Application Priority Data

Feb. 29, 1984 [CH] Switzerland ............... 1115/84

[51] Int. Cl.$^4$ ............... C22B 21/00; C25C 3/06
[52] U.S. Cl. ............... 204/67; 75/68 R
[58] Field of Search ............... 204/67, 243; 75/68 R

[56] References Cited

U.S. PATENT DOCUMENTS 3,846,123 11/1974 Racunas et al. ............... 75/68 R

FOREIGN PATENT DOCUMENTS 2821353 12/1978 Fed. Rep. of Germany ........ 204/67
2090153A 7/1982 United Kingdom ............... 75/20 R Primary Examiner—Howard S. Williams
Attorney, Agent, or Firm—Bachman & LaPointe

[57] ABSTRACT

A salt melt of alkali and/or alkali earth chlorides and fluorides, heated to 50°–100° C. above the melting point is employed to purify heavily contaminated scrap aluminum. The scrap aluminum, preheated to 400°–500° C. is added to a melting or holding furnace containing the less dense salt melt, the mixture stirred if necessary and then held at the above mentioned melt temperature for at least one hour. First the sedimented metal phase, then the salt melt are filtered through a resistant open pore ceramic filter and thus freed of solid impurities. The aluminum is transferred to an electrolytic cell for purification, and the molten salt melt recycled.

16 Claims, 1 Drawing Figure

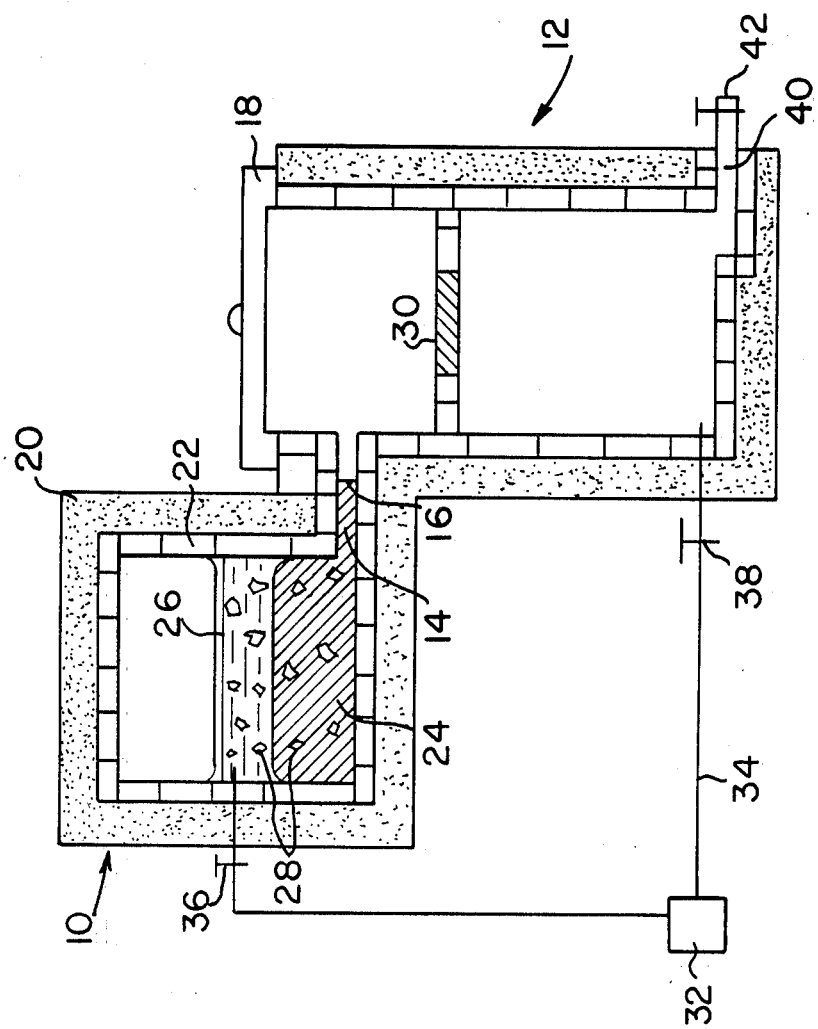

PROCESS FOR REFINING SCRAP ALUMINUM

BACKGROUND OF THE INVENTION

The invention relates to a process for refining heavily contaminated scrap aluminum using a melt made up of salts of alkali or alkaline earth chlorides and fluorides.

Particles of glass, oxides and stones are in general very harmful when refining heavily contaminated scrap aluminum, especially when the concentration of aluminum is below 50 wt %. The removal of such foreign matter has caused considerable difficulty when employing the conventional technology for this purpose. Before electrolytic purification however, whether by three layer electrolysis, bipolar electrolysis or fractional crystallisation, the contaminating particles of solid material must be removed.

The salts employed by the secondary aluminum industry today in conventional processes are consumed to an excessive degree because of the high concentration of oxides.

The object of the present invention is therefore to develop a process for purifying heavily contaminated scrap aluminum, using a melt of molten salts of alkali and alkali earth chlorides and fluorides, and this such that the said process is economical and operates with a high degree of efficiency.

SUMMARY OF THE INVENTION

This object is achieved by way of the invention in that the scrap aluminum preheated to 400°-500° C., is fed to a melt of molten salts which is heated to 50°-100° C. above the melting point and has a lower density than aluminum at the operating temperature, and the molten mixture is held for at least one hour at this temperature in a melting or holding furnace, then first the molten aluminum which has sedimented during holding, followed by the molten salt melt, is separated from the solid impurity matter by passing the aluminum and salt melt in that order through an open pore ceramic filter which is resistant to both filtrates, and finally the filtered molten aluminum is fed to an electrolytic cell for purification and the salt melt to a melting or holding furnace for re-use.

The use of the ceramic filter makes it possible, after melting the scrap aluminum in a molten salt bath and sedimenting out the molten aluminum in a holding furnace, to separate the molten aluminum with its metallic impurities from solid particulate material, mainly ceramic particles which are caught up in the scrap metal. Aluminum scrap from car dump for example usually contain more than 50 wt % of impurities.

In the subsequent electrolyte purification process the metallic impurities, such as iron, silicon and copper for example are separated selectively from the scrap metal. The electrolytic purification is carried out preferably in the form of the well known three layer electrolyte process which has been employed by the aluminum industry for a very long time, or by means of the bipolar electrolyte cell described in the U.S. patent application Ser. No. 630,289. A bipolar cell is employed in particular if the scrap aluminum has a high concentration of silicon and/or iron, as the large losses in copper occuring in the three layer process can be avoided.

The amount of salt required for carrying out the process according to the invention is calculated such that it is preferably 1.2-2 times, in particular 1.5 times, as large as the weight of scrap to be purified. The charges of salts employed comprise, usefully, of 30-50 wt % NaCl, 30-50 wt % KCl and 15-25 wt % cryolite. A melt which has proved particularly advantageous contains about 40 wt % NaCl, 40 wt % KCl and 20 wt % cryolite, said melt being held at a temperature of about 750° C. before the pre-heated scrap aluminum is added to it. Especially when the scrap is in small pieces it can be advantageous, before holding, to stir the molten mixture of salts and scrap aluminum. The main effect of this is to lower the concentration of magnesium in the aluminum scrap. The stirring is achieved by known mechanical means, for example using a magnetic stirrer or by injection of inert gases.

The purifying action of the salt melt can be increased by employing a conventional scrubbing gas such as chlorine before holding.

During holding, which lasts preferably 1-2 hours, droplets of aluminum sediment to the bottom of the holding vessel, for which the melting furnace also usefully serves.

After holding, the molten aluminum and the contaminated salt are present as two separate phases, the heavier aluminum being at the bottom and ready for filtering.

The filterchamber, which can be heated, holds the ceramic filter which, for example, is a version of that described in the German patent publication DE-OS No. 26 13 023 and is in the form of a slab. The relatively coarse pored filter made in particular of MgO, $Al_2O_3$, $MgOAl_2O_3$ or $ZrO_2$ has a porosity of 20-50 ppi (pores per inch), in particular 40 ppi.

The molten aluminum can flow unhindered through this exchangeable ceramic filter, while all the solid particles are held back. The aluminum thus freed of solid impurities is passed continuously or in charges from the filter chamber to a holding furnace or directly to the cell for electrolytic purification.

After all of the aluminum has been passed through the suspension in it is allowed to pass through the filter. Whereas the molten aluminum that has to be filtered contains only few solid particles, the main fraction of solid contaminants is presented to the ceramic filter by the molten salt. There the particles form a cake which, after passage of the charge, can be removed either together with or separate from the ceramic filter.

The molten salt purified of solid particulate matter is returned to the melting furnace where it can be fed the next charge of scrap aluminum.

The invention is explained in greater detail with the help of a schematic drawing.

BRIEF DESCRIPTION OF THE DRAWING

The schematic, vertical cross-section shows a melting furnace which serves at the same time as a holding furnace, and also shows a filter chamber which can be heated and is connected to the said furnace.

DETAILED DESCRIPTION

The device for purifying heavily contaminated scrap aluminum comprises essentially a melting furnace 10 which at the same time serves as a holding furnace, and a filter chamber 12 which can be heated, both vessels being connected by a channel 14 featuring a drainage valve 16. The whole device, apart from the insulating lid 18 which can be raised, is surrounded by refractory brickwork 20 which is lined with magnesite bricks 22.

The preheated scrap aluminum 24 is poured into the furnace via an opening which for simplification is omitted here. Shown in the figure are the phases which have separated after holding, the lighter molten salt melt 26 containing the main fraction of the solid impurities 28 being at the top. The lower, molten aluminum contains only a small amount of such impurities 28.

The ceramic filter 30 situated in the filter chamber 12 at a level lower than the connecting channel 14 is plate or slab shaped.

If the molten aluminum, freed of solid impurities, is drained as a charge, then the volume below the ceramic filter is at least sufficiently large that it can hold the whole metal fraction of the scrap aluminum charged to the furnace.

The molten aluminum freed of the solid impurities 28 is removed from the filter chamber 12 through a channel 40 which can be closed off by valve 42.

The molten salt bath scrubbed of solid impurities 28 is returned to the melting furnace 10 by means of a pump 32 via pipeline 34 which features two closing-off devices 36, 38.

For simplicity the conventional means for heating the melting furnace and the filter chamber are not known here; likewise the optional means for mechanical stirring or introducing inert or chemically active gases are omitted here.

Further, the filter chamber is fitted with a drainage pipe, not shown here, for draining off the salt bath if it is so heavily contaminated that it is not to be returned to the furnace 10, but instead is to be replaced.

1ST EXAMPLE

Scrap aluminum containing 50-60 wt % impurities in particular in the form of oxide phases, was melted in a mixture of 40 wt % sodium chloride, 40 wt % potassium chloride and 20 wt % cryolite and filtered through a 40 ppi MgO filter plate. The metal leaving the filter was found to contain 9 wt % Si, 0.7 wt % Fe and 3.3 wt % Cu. The aluminum yield (extraction coefficient) was 90%.

The aluminum, freed of solid impurity matter, was then fed to a bipolar cell for purification according to the U.S. patent application Ser. No. 630,289. The separation factors for Si and Fe were 99%, for Cu 98% and for Mg 95%. These separation factors designate a purified scrap aluminum of 99.99% purity.

2ND EXAMPLE

During metal transfer, alloy preparation and gas treatments in various holding and melting furnaces, considerable quantities of aluminum dross are produced. Conventional treatment of such low grade, finely divided metal contaminated with non-metallic substances is not possible without some kind of preliminary purification. Preheated aluminum dross with a metal content of 60-80 wt % was melted in a salt bath comprising 45 wt % KCl, 45 wt % NaCl and 10 wt % AlF$_3$ and filtered through a highly sintered 45 ppi Al$_2$O$_3$ filter plate. The extraction coefficient for the metal lay between 85 and 90%. The aluminum obtained had a purity of 90-99%. This was purified further in a conventional three layer electrolyte cell. The resultant separation factor corresponded to those achieved today using smelter aluminum (approx. 89.5%) i.e. the purified aluminum corresponds to conventional 99.99% metal.

3RD EXAMPLE

Extremely fine granular aluminum or aluminum dust for which direct melting is out of the question was mixed with an anhydrous salt mixture of 45 wt % NaCl, 45 wt % KCl and 10 wt % NaF and melted under a protective atmosphere of nitrogen. The dross is filtered off by a filter plate such as is mentioned in the second example.

4TH EXAMPLE

Dross containing large amounts of salts can cause considerable environmental problems. Such aluminum dross containing salts (up to 48 wt % of salts) was melted in a salt mixture, comprising 45 wt % NaCl, 45 wt % KCl and 10 wt % cryolite, at 750° C., allowed to sediment and then filtered through a 45 ppi MgO filter. The average extraction coefficient was 70-80%.

5TH EXAMPLE

Aluminum dross containing only 20 wt % of metallic aluminum was treated as in example No. 4. The extraction coefficient was 60-75%. The aluminum, freed of solid impurities was, as in examples 3 and 4, purified further by means of a bipolar cell as in the last example.

What is claimed is:

1. Process for purifying contaminated scrap aluminum using a melt of molten salts of alkali and alkali earth chlorides and fluorides which comprises admixing a melt of said contaminated aluminum scrap and a melt of said molten salts wherein said salts have a lower density than said aluminum at the operating conditions to form a molten mixture, holding said molten mixture for at least one hour in the molten state in a holding furnace whereby molten aluminum sediments during holding, first separating the molten aluminum from soli contaminants by passing said molten alumunum through an open pore filter resistant to said aluminum, followed by passing the salt melt through an open pore filter resistant to said melt, and purifying the filtered molten metal.

2. A process according to claim 1 wherein the molten salts are heated to a temperature of 50° to 100° C. above the melting point thereof.

3. A process according to claim 2 wherein the contaminated aluminum scrap is preheated to 400° to 500° C. and fed to the melt of molten salts.

4. A process according to claim 3 wherein the salt melt comprises about 40 wt.% sodium chloride, 40 wt.% potassium chloride and 20 wt.% cryolite and wherein said salt melt is held at a temperature of about 750° C. before the addition of the preheated aluminum scrap and also during the holding stage.

5. A process according to claim 1 wherein the molten aluminum followed by the molten salt melt are passed through an open pore ceramic filter which is resistant to both filtrates.

6. A process according to claim 5 wherein the solid contaminants are removed by means of a ceramic filter selected from the group consisting of magnesium oxide, aluminum oxide and zirconium oxide.

7. A process according to claim 5 wherein the ceramic filter has a porosity of 20 to 50 pores per inch.

8. A process according to claim 1 wherein the filtered molten metal is fed to an electrolytic cell for purification.

9. A process according to claim 1 wherein the filtered salt melt is fed to a furnace for reuse.

10. A process according to claim 1 wherein the salt melt and scrap aluminum are charged in a weight ratio of 1.2–2:1.

11. A process according to claim 1 wherein said salt melt comprises 30 to 50 wt.% sodium chloride, 30 to 50 wt.% potassium chloride and 15 to 25 wt.% cryolite.

12. A process according to claim 1 wherein before holding the said molten mixture is mechanically stirred.

13. A process according to claim 1 wherein before holding the said molten mixture is stirred by the introduction of inert gases.

14. A process according to claim 1 wherein before holding at least one gas is introduced into said molten mixture.

15. A process according to claim 14 wherein said purifying gas is chlorine.

16. A process according to claim 1 wherein sedimentation of the molten aluminum takes place during a holding time of 1 to 2 hours.

* * * * *

UNITED STATES PATENT AND TRADEMARK OFFICE
CERTIFICATE OF CORRECTION

PATENT NO. : 4,568,430
DATED : February 4, 1986
INVENTOR(S) : Sylvestre Vire

It is certified that error appears in the above-identified patent and that said Letters Patent are hereby corrected as shown below:

In Column 4, claim 1, line 36, change "soli" to read ---solid---.

In Column 4, claim 1, line 37, change "alumunum" to read ---aluminum---.

In Column 4, claim 1, line 40, after "said" insert ---salt---.

In Column 6, claim 14, line 5, after "into" insert ---the---.

Signed and Sealed this

Tenth Day of June 1986

[SEAL]

Attest:

DONALD J. QUIGG

Attesting Officer  Commissioner of Patents and Trademarks